Oct. 15, 1929.  R. W. NILSSON  1,732,166
BUMPER
Original Filed Sept. 12, 1927
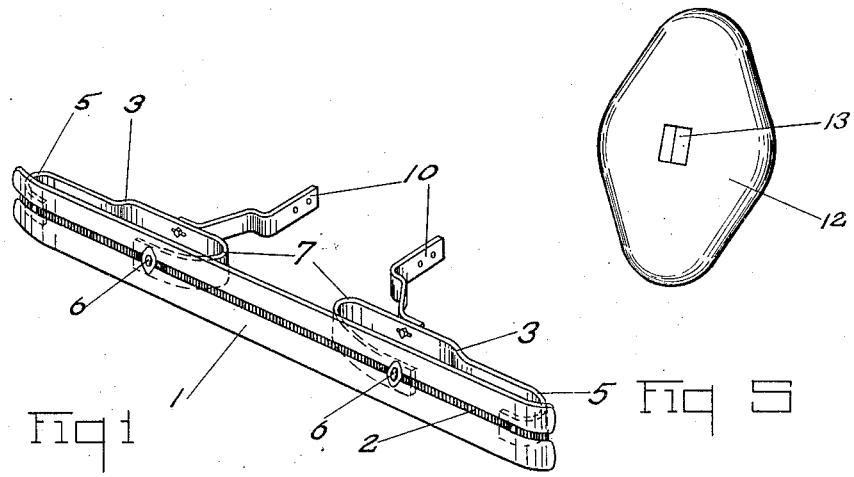
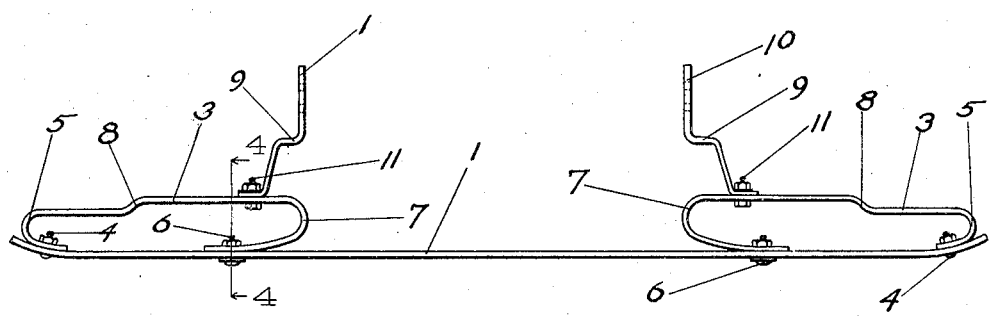
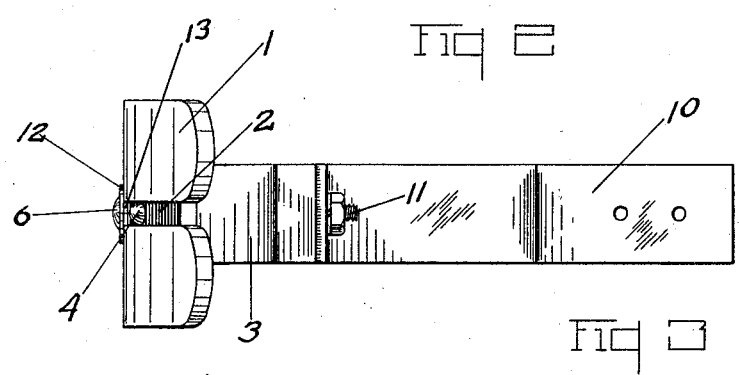
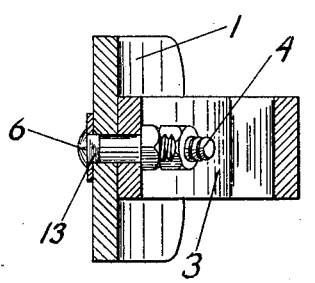
Inventor
Robert W. Nilsson
By Faust F. Crampton
Attorney Patented Oct. 15, 1929

1,732,166

UNITED STATES PATENT OFFICE

ROBERT W. NILSSON, OF TOLEDO, OHIO, ASSIGNOR TO THE MATHER SPRING COMPANY, OF TOLEDO, OHIO, A CORPORATION OF OHIO

BUMPER

Application filed September 12, 1927, Serial No. 218,920. Renewed March 20, 1929.

My invention has among its objects to provide a resilient bumper member of such construction as to render it quite rigid and yet of sufficient resilience to elastically absorb the shocks that might be received in ordinary usage. My invention particularly has for its object to provide a bumper having a single impact receiving bar so made as to present the appearance of double impact receiving bars and still offering the solidity and strength of a single impact receiving bar of approximately twice the usual width of such bars, and yet having the resiliency and shock absorptive power of the ordinary two-bar construction. In constructions containing my invention there is offered a progressive resistance to the transmission of shocks to the vehicle by which it is carried.

Bumpers embodying my invention may vary in their details of construction and may be installed and used on both the front and rear of a vehicle. The bumper selected as an example of embodiments of my invention and shown in the drawing is for the front end of a vehicle. Many features of my invention not specifically stated in this specification will be apparent upon examination of the accompanying drawings, and from the following description.

With reference to the accompanying drawings, Fig. 1 is a perspective view of the bumper. Fig. 2 is a top view of the bumper and shows the construction whereby the progressive resistance is offered. Fig. 3 is a side view of the bumper. Fig. 4 is a view of a section taken along the plane of the line 4—4 indicated in Fig. 2. Fig. 5 is a perspective view of a metal plate that is used in presenting the double bar appearance.

The impact receiving bar 1 is made of stock having, preferably, a width equal to at least twice that of the usual bumper bar. The bar 1 is provided with the groove 2 that is located in the center of the bar 1 and extends the full length of the bar. By placing in this groove a dark colored enamel, preferably black, a double bar appearance is offered and is made more effective by the dark background afforded by the lower parts of a vehicle upon which the bumper may be installed. At points adjacent the ends of the bar 1 are connected the spring or cushion members 3 by the bolts 4. From the points of connection by the bolts 4, the spring or cushion members 3 are curved rearwardly and inwardly so as to form the relatively sharply curved portions 5 whereby the cushion members 3 will efficiently absorb impacts received on the ends of the bumper. At points 8 adjacent the curved portions 5 and inwardly located relative to the vertical planes of the wheels of the vehicle, the cushion members 3 are again curved rearwardly and then inwardly to points that will be substantially in line with the channelled side members of the vehicle, where they are curved forwardly and outwardly to form the curved portions 7 and again come in contact with the impact bar 1. The curved portions 7 terminate in parts that are inclined at a very small angle to the bar 1, and as the rigid bar 1 is subjected to pressure, the angle of the end portions of the curved parts 7 decreases, and if the pressure is sufficiently great, the rigid bar is forced into contact with the said portions that are normally inclined to the rigid bar 1. The length of the inclined portions that are thus brought into contact with the rigid bar 1 will vary as the pressure is increased. The cushion members are again at these points connected to the bar 1 by the bolts 6 and form loops, each loop having both ends closed.

The curved portions 7 being relatively large and being so located that practically all impacts received by the bumper will cause these portions to offer a progressively increasing resistance in that the less intense impacts will cause the forwardly and more gently curved sections of the curved portions 7 to flex and absorb the shock, while the more intense impacts will be absorbed by the increasing curvature of the curved portions 7.

The supporting members 10 are secured by the bolts 11 to the cushion members 3 at points adjacent the curved portions 7 and to the rear thereof. The members 10 are curved rearwardly and inwardly to the mid-points of the members 10 where they are curved inwardly, as at 9, to points substantially in line with the channelled side members of the vehicle frame. The members are then curved rearwardly to form shanks for attaching the bumper to the vehicle.

The parts 10 are so formed at 9 as to permit and yet yieldingly resist the bending of the bumper as a whole. Impacts received at the ends of the bumper cause the bumper body to bend forward. The central portion of the bumper is advanced forward while both ends of the bumper, where the impact is excessive, will be moved backward by reason of the connection of the ends of the resilient curved portions 7 to the bumper at the points shown in the drawings and the flexing of the parts 3 particularly at the bends 8.

The plates 12 have the centrally located square openings 13 of substantially the same size as the groove 2 of the impact receiving bar. The bolts 6 have adjacent their heads a square portion of sufficient length to extend through the opening 13 of the plate and engage the groove 2 of the impact receiving bar. The plates 12, being held securely in position by the bolts 6, serve to complete the double bar appearance by apparently acting as a spacer.

I claim:

1. In a bumper for vehicles, a rigid bar member, a pair of elastic metal spring members located at the ends of the rigid bar member, each elastic member having curved end portions, one of the curved end portions of each spring member having a small curvature, the latter curved portion terminating in a portion of still less curvature and inclined at a slight angle to the rigid bar member to increasingly resist pressure on the rigid bar, and means for connecting the ends of each elastic member to the rigid bar member at points removed from the ends and from the center of the rigid bar member.

2. In a bumper for vehicles, a rigid bar member, a pair of elastic metal spring members located at the ends of the rigid bar member, each elastic member having curved end portions, one of the curved end portions of each spring member having a small curvature, the latter curved portion terminating in a portion of still less curvature and inclined at a slight angle to the rigid bar member to increasingly resist pressure on the rigid bar, rivets for connecting the ends of each elastic member to the rigid bar member at points removed from the ends and from the center of the rigid bar member and a pair of bars having laterally extending flexible portions for connecting the elastic members to the frame of the vehicle.

In witness whereof I have hereunto signed my name to this specification.

ROBERT W. NILSSON.